United States Patent
Jain et al.

(10) Patent No.: US 9,229,890 B2
(45) Date of Patent: Jan. 5, 2016

(54) METHOD AND A SYSTEM FOR INTEGRATING DATA FROM A SOURCE TO A DESTINATION

(75) Inventors: Sandeep Jain, Palo Alto, CA (US); Prakash Chandra Tiwary, Gurgaon (IN)

(73) Assignees: SANDEEP JAIN CA (US); PRAKASH CHANDRA TIWARY, Gurgaon (IN)

( * ) Notice: Subject to any disclaimer, the term of this patent is extended or adjusted under 35 U.S.C. 154(b) by 379 days.

(21) Appl. No.: 13/457,497

(22) Filed: Apr. 27, 2012

(65) Prior Publication Data

US 2013/0117229 A1 May 9, 2013

Related U.S. Application Data

(60) Provisional application No. 61/480,291, filed on Apr. 28, 2011.

(51) Int. Cl.
*G06F 17/30* (2006.01)
*G06F 13/22* (2006.01)

(52) U.S. Cl.
CPC .......... *G06F 13/22* (2013.01); *G06F 17/30008* (2013.01); *G06F 17/30575* (2013.01)

(58) Field of Classification Search
CPC ................................................ G06F 17/30575
See application file for complete search history.

(56) References Cited

U.S. PATENT DOCUMENTS

| | | | |
|---|---|---|---|
| 2004/0193952 A1* | 9/2004 | Narayanan et al. | 714/13 |
| 2005/0027755 A1* | 2/2005 | Shah et al. | 707/201 |
| 2005/0256907 A1* | 11/2005 | Novik et al. | 707/200 |
| 2006/0242444 A1* | 10/2006 | Novik et al. | 713/400 |
| 2007/0100834 A1* | 5/2007 | Landry et al. | 707/10 |

\* cited by examiner

*Primary Examiner* — Syed Hasan
(74) *Attorney, Agent, or Firm* — Barry Choobin; Patent 360 LLC

(57) ABSTRACT

The embodiments herein provide a system and a method for integrating a data from a source to a destination. The method comprises generating a global-id, setting an event-id corresponding to an entity id in the global id, polling a data from a source, sorting changes of a source system based on a time of update and an entity id, creating and comparing an old as of state value and a new as of state value for each field for each update in the entity in the source and destination to detect a conflict on an entity, sending a time of update in the entity and a revision id of a change to the destination, comparing the global id with an event id for each entity at the destination to detect a presence of an entity in the destination and processing an entity at the destination based an event id.

6 Claims, 3 Drawing Sheets

METHOD AND A SYSTEM FOR INTEGRATING DATA FROM A SOURCE TO A DESTINATION

CROSS-REFERENCE TO RELATED APPLICATION

This application claims the priority under 35 USC 119(e) of U.S. Provisional Application Ser. No. 61/480,291 filed Apr. 28, 2011 which is included by reference herein.

BACKGROUND

1. Technical Field

The embodiments herein generally relate to a data integration process and particularly relate to a method of integrating a data from a source to a destination. The embodiments herein more particularly relate to a method and system for integrating a data from a source to a destination in real time.

2. Description of the Related Art

A data integration process involves combining a data residing in different sources and providing the users with a unified view of the data. In this process, a data is frequently fetched (polled) from a source system to achieve the changes in the destination. The data integration process becomes significant in a variety of situations such as commercial and scientific fields. In commercial field, the data integration plays very important role in merging the databases of two similar companies. In a similar way, there is a need to provide an integration among the data in scientific field while combining the research results from different repositories.

An important aspect of data integration is writing the polled data at the destination after processing the polled data. At present there are many systems and methods for processing a data. A polling of the data from a source system means reading the data from the source system. A processing of the data involves writing the authenticated data in the destination system after reading a data from the source system. A polling frequency indicates a frequency of polling and reading the data from the source. A difference in time between two polling processes is referred as a polling interval. A polling data can be a data of same entity or different entities or new entity.

An integration solution is always expected to process the data as soon as it is generated at the source. A polling process can be done frequently to bring the changes quickly. But this is not enough to bring the source and destination systems in a synchronized stated until the polled data is processed. After processing the data the systems are synchronized. Therefore a processing of the data need to be fast besides a frequent polling process. One way of achieving a quick processing of data is to perform a parallel processing operation. The processing of the data in parallel can work as long the data are independent in nature. But the parallel processing will bring either inconsistency or failure when the data are dependent on each other.

An integration solution provides an effective way to keep two systems in a synchronized state. So it is very important to transfer all the changes from the source to the destination in an integration process. For fetching all the changes, the integration solution has to look into a source after every preset time interval, to check for any updates of an entity. The standard integration solution is designed based on a current state of date. Consider a case in which an entity gets updated more than once between two successive polling intervals. Consider case in which a first polling is done at a time t1 and the next polling is done at a time t5. But before t5 and after t1, the entity E1 is updated twice at the times t2 and t4. c1 is a change done at the time t2 and c2 is the change done at the time t4. Now suppose that the change c2 is dependent on the change c1 so that the change c2 can only be made only after doing the change c1. During an integration process, the polling done at t5 will fetch the entity E1 updated at t4 so that only the latest state of E1 which is c2 is polled and synchronized to the destination. The change c1 is not synchronized to destination and c2 fails as c1 which is a prerequisite is not found in the destination. One way of solving the problem is to attach a trigger to the source. The trigger on each update in system publishes a change list to the integration system. The integration system can then work on it effectively. In the above case, a trigger is generated to invoke an integration application with the set of changes done in c1 as soon as a change c1 is done and it will be repeated for c2. This allows the integration system to track all the changes done in the system and the integration solution will be able to synchronize the changes immediately. But consider the case in which an integration system goes down because of power shutdown or system crash or some other run time failures. Whenever there is any change in system, a trigger invokes an integration system and ensures that no other component is activated. When the trigger does not initiate any action, then the integration system will miss the change. Even when the trigger initiates an exemption then also the integration system will miss the change. When the integration system is operated afterwards, it will be unaware of the changes made to the entity in the source system and will try to synchronize the next incoming change normally. Thus attaching the trigger also does not work at times. This solution is not versatile and does not provide a robust approach.

Every integration solution has two functions. One function is a polling process to fetch all the changes to an entity from the system and pass the same for further processing. The integration solution also functions as an adapter to accept the changes coming from other systems to write the same to the destination. During a polling process, the integration solution has to take care of various expected and unexpected failure cases besides a data fetching process to ensure that all the changes are polled and a given change is fetched only once. Similarly the adapter is operated not only for writing the changes but also for ensuring that no change is written twice or no change is overwritten in the destination. Even when the polling module ensures that no change is polled and sent twice, the adapter is also operated to prevent the handling of update request coming more than once. For any good integration solution, all parts are decoupled from each other and all the components are not aware of the existence of anything else than their function in an integration solution. The polling part is not aware of the working and functioning of the adapter and the same holds good for the adapter too. Sometimes the adapter has to handle the situation in which a same change is to be written twice in the destination. Consider a case in which the adapter does not keep track of the changes till the changes are written. The adapter fetches an event E1 and writes the same to destination with state S1 and system goes down afterwards. Now a user comes and updates the destination entity to a state S2. When the polling module sends the entity E1 again at this moment due to some reason, then the adapter will write E1 again rolling back the state in S2 to S1. To ensure that the adapter does not roll back any changes done by an external user, it is important to check whether the event has already been addressed or not. It can be solved in one way by comparing a current/latest state in the destination with the incoming new values and updating the new value in the destination when it is found that the latest state/value is not same as the new value. But this solution does not work when the destination is updated by some other user and the incoming new values may not be equal to the current state in the destination after this update. As a result, the adapter will overwrite the new changes done by user and will roll back to the old state thereby leading to the old problem. Thus the currently available solutions do not solve the failures in the integration process fully and reliably. Thus the sync is not recoverable with the existing solutions for any kind of failures.

The main job of an integration solution is to synchronize the data from a source to a destination and to keep all the updates done in the source in a synchronized condition with the destination. It is very critical for an integration solution to ensure that the source data is written at a right place in the destination. Any failure in a synchronization process results in an invalid or irrecoverable condition in the destination which may result in a loss to the company in terms of time or money as important data is no more valid. Hence there is a need to develop an integration process to ensure that the data is written at a right place in the destination.

Consider a case in which a user created an entity E1 in a source system and the integration solution fetched the entity and wrote the same into the destination as TE1. A synchronisation process is carried out once but there is a need to consider the further updates done on E1. The integration solution has to ensure that the further updates are written on TE1. When there is a failure in the integration process and TE2 is updated, then the first user will lose data in TE2 and TE1 will not be in a synchronized condition. The integration solution has to identify the right entity since the update has to be written only on the right entity at the destination. And also the integration has to confirm that E1 in the source is in the same state as the TE1 in destination. The currently available solutions for achieving this explained as follows. The name or title of the entity is checked first. Secondly a primary key is written in the custom field in a target. By sorting the entity by name, an entity E1 in the source created with name N1 is synchronized to the destination with the same name N1. When the entity E1 is updated next time, then the destination is searched to get the entity with name N1. When TE1 is obtained based on the name N1, then TE1 is updated correctly. But systems can allow different entities to have the same name. For example, when an entity E2 is also assigned with a name N1 in the source, then TE2 is also assigned with the same name N1 in the destination or target. In such a condition it will be difficult to select an entity (TE1 or TE2) from the destination based on name for updating when E1 or E2 is updated at the source, as both the TE1 and TE2 are assigned with the same name N1 in the destination. Thus a process of searching an entity by name to update the changes in the destination does not result in a proper updating process. Hence a global id is generated to solve this problem. With the existing global id generation method, it is very difficult to find the replica of the entity in all the synchronized systems. Further the existing solutions are also not extensible.

According to embodiment herein, the system further comprises using an event based trigger and a scheduler based trigger to poll and synchronize a data from a source to a destination.

When a poll is active at the time of a scheduler based trigger, then the scheduler based trigger is skipped. When an event based trigger is received and no poll is active, then the event based trigger kicks off the polling process. When the poll is active, the event based trigger sets a flag indicating a need to repoll at the end of a poll. At the end of a poll, the repoll flag is checked for. When the repoll flag is set, then another poll cycle is immediately kicked off.

Hence, there is a need for a method for integrating a data from a source to a destination in real time to replicate all the changes done to an entity in the source in the destination without missing any updates. There is also a need for a method to address the problems with incremental changes, bulk changes, changes from multiple locations of a source. Further there is a need for a solution to integrate a data based on a as of state condition of the entity. Yet there is a need to integrate a data using a multistep recovery process.

The abovementioned shortcomings, disadvantages and problems are addressed herein and which will be understood by reading and studying the following specification.

OBJECTS OF THE EMBODIMENTS

The primary object of the embodiments herein is to provide a method and system for integrating a data from a source to a destination.

Another object of the embodiments herein is to provide a method and system for integrating a data from a source to a destination in real time.

Yet another object of the embodiments herein is provide a method and system for integrating a data from a source to a destination to solve a problem of multiple updates of a single entity between two polling interval.

Yet another object of the embodiments herein is to provide a method and system for integrating a data from a source to a destination to recover a changes in the data after a failure in an integration process.

Yet another object of the embodiments herein is to provide a method and system for integrating a data from a source to a destination to provide a method for generating unique global id and event-id across a system to solve the update of entitles with a same name.

Yet another object of the embodiments herein is to provide a method and system for integrating a data from a source to a destination to easily create Multi-Point interconnections.

Yet another object of the embodiments herein is to provide a method and system for integrating a data from a source to a destination to use the established connectors to connect appropriate systems.

Yet another object of the embodiments herein is to provide a method and system for integrating a data from a source to a destination to create and manage the custom mappings.

Yet another object of the embodiments herein is provide a method and system for integrating a data from a source to a destination to provide a built in support for recovery management, conflict detection and management, failure management.

Yet another object of the embodiments herein is to provide a method and system for integrating a data from a source to a destination to provide a communication in real-time.

Yet another object of the embodiments herein is to provide a method and system for integrating a data from a source to provide a destination support for pre and post commit event handling.

Yet another object of embodiments herein is to provide a method and system for integrating a data from a source to a destination to provide an extensible and easy to integrate/support additional tools/systems.

Yet another object of the embodiments herein is to provide simple installation, support and maintenance of integration solution.

Yet another object of the embodiments herein is to provide a method and system for integrating a data from a source to a destination to make use of a hub and spoke topology, to decouple a source and a destination by inserting a central component acting as an active mediator.

Yet another object of the embodiments herein is provide a method and system for integrating a data from a source to a destination to use hub and spoke technology to provide a flexibility of a system extension.

These and other objects and advantages of the embodiment herein will become readily apparent from the following summary and the detailed description taken in conjunction with the accompanying drawings.

SUMMARY

The various embodiments herein provide a method and system for integrating a data from a source to a destination. The method for integrating a data from a source to a destination comprises generating a global-id by concatenating a source system, name of an entity, an entity project id and an entity id, setting an event-id corresponding to an entity id in the global id, polling a data from a plurality of entities of a source system, sorting a plurality of changes of a source system based on a time of update and an entity id, creating an old as of state value for each field for each update in the entity in the source system, creating a new as of state value for each field for each update in the entity in the destination system, sending an event to a destination system with the old as of state value and the new as of state value for each update in the entity, comparing the created old as of state value and the created new as of state values for each field for update in the entity to detect a conflict on an entity, sending a time of update in the entity and a revision id of a change to the destination, comparing the global id with an event id for each entity at the destination to detect a presence of an entity in the destination system and processing an entity at the destination system based an event id.

The method further comprises a step of performing a multistep recovery process to ensure a reliable synchronization of entity and to recover a synchronization of entity in case of a transaction failure of any kind, when a main transaction process has a plurality of sub transactions so that a recovery and synchronization of a data up to a sub transaction level is possible. The old as of state value and the new as of state values are created for each field for update in the entity to synchronize an event in the destination.

According to an embodiment herein, a step of processing the entity at the destination system comprises executing a main transaction process for the entity with the same global id, dividing the update process for the entity into a plurality of sub transactions, assigning a substep number to each sub transaction in the update process, comparing a time of revision of a last update value in the source system with a time of revision of a last update value in the destination system, processing the entity at the destination system based on a comparison of the time of revision of the last update value in the source system with the time of revision of the last update value in the destination system and creating a new entity with an event id equal to the first global id. The new entity is created when no entity is found in the destination system with a same global id. The main transaction process is an update process for the entity.

According to an embodiment herein, a step of processing the entity at the destination system based on a comparison of the time of revision of the last update value in the source system with the time of revision of the last update value in the destination system comprises updating the entity at the destination system, comparing a step number assigned to a sub transaction corresponding to a last update process in the source system with the step number assigned to a sub transaction corresponding to a last update process in the destination system and performing a sub transaction of the update process. The entity is updated when the time of revision of the last update value in the source system is greater than the time of revision of the last update value in the destination system and the global id is equal to the event id of the entity.

According to an embodiment of the embodiments herein, a step number assigned to a sub transaction corresponding to a last update process in the source system with the step number assigned to a sub transaction corresponding to a last update process in the destination system is compared when the time of revision of the last update value in the source system is smaller than or equal to the time of revision of the last update value in the destination system.

According to an embodiment herein, a step of performing the sub transaction of the update process comprises processing a sub transaction of the update process and moving a control to a next step in the update process when the step number assigned to a sub transaction corresponding to the last update process in the source system is smaller than the step number assigned to a sub transaction corresponding to the last update process in the destination system. The sub transaction is processed when the step number assigned to a sub transaction corresponding to the last update process in the source system is greater than the step number assigned to a sub transaction corresponding to the last update process in the destination system.

According to an embodiment herein, a step of creating an old as of state value for each field for each update in the entity in the source system comprises initializing a temporary variable for each field for each update in the entity in the source system, fetching all updates for the entity in the source system from a history of the source system created on or after an initial time, iterating all the updates for the entity in the source system in a descending order of an update time for the entity in the source system. The temporary variable of each field for each update in the source system is assigned as the old as of state value.

According to embodiment herein, the method further comprises using an event based trigger and a scheduler based trigger to poll and synchronize a data from a source to a destination.

When a poll is active at the time of a scheduler based trigger, then the scheduler based trigger is skipped. When an event based trigger is received and no poll is active, then the event based trigger kicks off the polling process. When the poll is active, the event based trigger sets a flag indicating a need to repoll at the end of a poll. At the end of a poll, the repoll flag is checked for. When the repoll flag is set, then another poll cycle is immediately kicked off.

According to an embodiment herein, the system for integrating data from a source to a destination comprises a connector framework and wherein the connector framework comprises two connector modules, a polling module and an adopter module, a processing manager, a mapping manager, a recovery manager, a conflict manager and a failure manager. The polling module reads the plurality of changes from the source and the adapter module to write the plurality of changes at the destination. The processing manager processes a poll event using a processing engine. The mapping manager maps a plurality of fields of the source to corresponding fields of a destination. The recovery manager automatically recovers a data in case of an unexpected failure. The failure manager controls a failed event during an integration process.

According to an embodiment herein, the failed event is the one in which a change in a data is not written to the destination, According to an embodiment herein, the conflict manager solves one or more conflicts occurring during an integration process and wherein a conflict is occurred, when a current value of any field of the destination doesn't match with a last value of a field of the source.

According to an embodiment herein, a processing engine is any one of a Java Process Definition Language (JBOSS JPDL), Drools and an Apache Orchestration Director Engine (ODE).

According to an embodiment herein, the processing manager reports a successful integration process back to the source after a completion of a successful integration process.

According to an embodiment herein, the processing manager passes a control to a failure manager after an unsuccessful integration process.

According to an embodiment herein, the recovery manager controls the adapter module and the polling module.

According to an embodiment herein, the conflict manager detects a conflict to activate an integration model to resolve the conflict automatically.

According to an embodiment herein, the integration model is at least one of a master/slave model, a partitioned ownership model, a dynamic ownership model, a peer to peer model and a custom configuration model. In the master/slave model, the entity is created at the master and one or more read only copies of the entity are created in slave system. In the partitioned ownership model, one or more fields of the entity are created at one or more systems. An ownership of the entity changes dynamically in the dynamic ownership model. In peer to peer model, a plurality of sites is able to make changes to the entities to carry out a conflict detection process and a conflict resolving process. A replication model is customized using the custom configuration model.

According to embodiment herein, the system further comprises an event based trigger and a scheduler based trigger to poll and synchronize a data from a source to a destination.

When a poll is active at the time of a scheduler based trigger, then the scheduler based trigger is skipped. When an event based trigger is received and no poll is active, then the event based trigger kicks off the polling process. When the poll is active, the event based trigger sets a flag indicating a need to repoll at the end of a poll. At the end of a poll, the repoll flag is checked for. When the repoll flag is set, then another poll cycle is immediately kicked off.

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1:
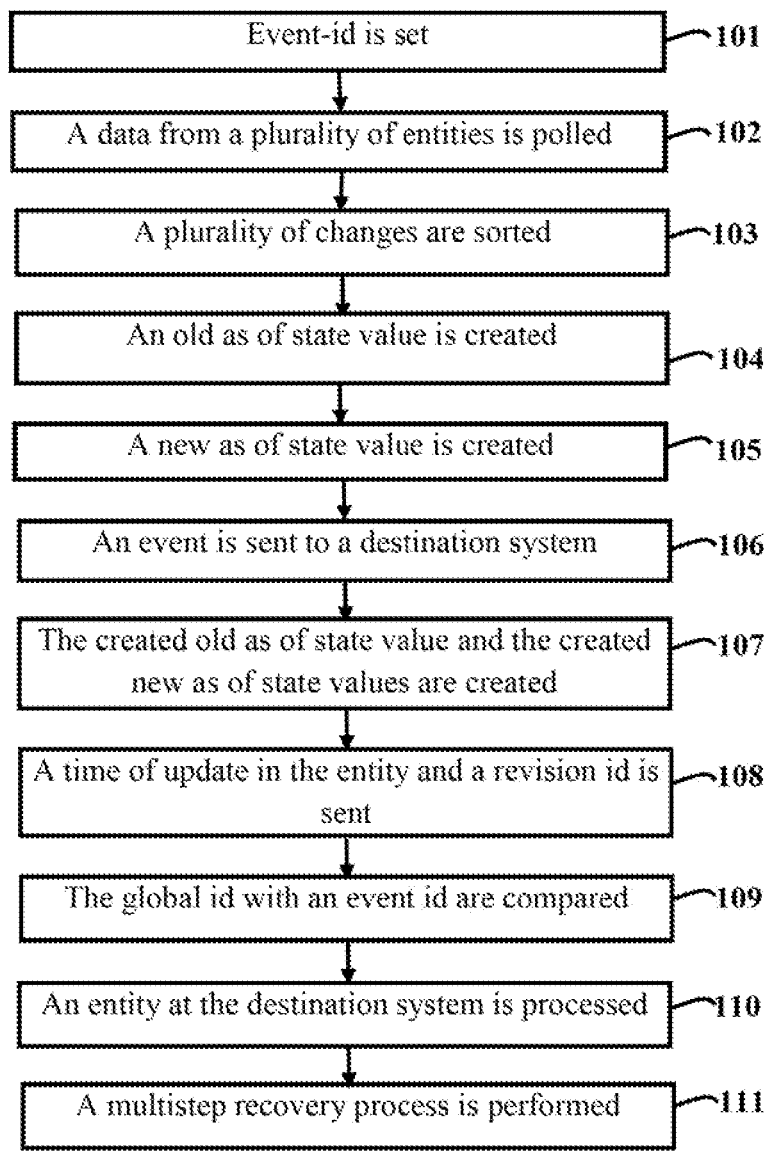
FIG. 1 illustrates a flowchart illustrating a method for integrating a data from a source to a destination, according to an embodiment herein.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a method and system for integrating a data from a source to a destination. The method for integrating a data from a source to a destination comprises generating a global-id by concatenating a source system, name of an entity, an entity project id and an entity id, setting an event-id corresponding to an entity id in the global id, polling a data from a plurality of entities of a source system, sorting a plurality of changes of a source system based on a time of update and an entity id, creating an old as of state value for each field for each update in the entity in the source system, creating a new as of state value for each field for each update in the entity in the destination system, sending an event to a destination system with the old as of state value and the new as of state value for each update in the entity, comparing the created old as of state value and the created new as of state values for each field for update in the entity to detect a conflict on an entity, sending a time of update in the entity and a revision id of a change to the destination, comparing the global id with an event id for each entity at the destination to detect a presence of an entity in the destination system and processing an entity at the destination system based an event id. The method further comprises a step of performing a multistep recovery process to ensure a reliable synchronization of an entity and to recover a synchronization of an entity in case of a transaction failure of any kind, when a main transaction process has a plurality of sub transactions so that a recovery and synchronization of a data up to a sub transaction level is possible. The old as of state value and the new as of state values are created for each field for update in the entity to synchronize an event in the destination.

According to an embodiment herein, a step of processing the entity at the destination system comprises executing a main transaction process for the entity with the same global id, dividing the update process for the entity into a plurality of sub transactions, assigning a substep number to each sub transaction in the update process, comparing a time of revision of a last update value in the source system with a time of revision of a last update value in the destination system, processing the entity at the destination system based on a comparison of the time of revision of the last update value in the source system with the time of revision of the last update value in the destination system and creating a new entity with an event id equal to the first global id. The new entity is created when no entity is found in the destination system with a same global id. The main transaction process is an update process for the entity.

According to an embodiment herein, a step of processing the entity at the destination system based on a comparison of the time of revision of the last update value in the source system with the time of revision of the last update value in the destination system comprises updating the entity at the destination system, comparing a step number assigned to a sub transaction corresponding to a last update process in the source system with the step number assigned to a sub transaction corresponding to a last update process in the destination system and performing a sub transaction of the update process. The entity is updated when the time of revision of the last update value in the source system is greater than the time of revision of the last update value in the destination system and the global id is equal to the event id of the entity.

According to an embodiment of the embodiments herein, a step number assigned to a sub transaction corresponding to a last update process in the source system with the step number assigned to a sub transaction corresponding to a last update process in the destination system is compared when the time of revision of the last update value in the source system is smaller than or equal to the time of revision of the last update value in the destination system.

According to an embodiment herein, a step of performing the sub transaction of the update process comprises processing a sub transaction of the update process and moving a control to a next step in the update process when the step number assigned to a sub transaction corresponding to the last update process in the source system is smaller than the step number assigned to a sub transaction corresponding to the last update process in the destination system. The sub transaction is processed when the step number assigned to a sub transaction corresponding to the last update process in the source system is greater than the step number assigned to a sub transaction corresponding to the last update process in the destination system.

According to an embodiment herein, a step of creating an old as of state value for each field for each update in the entity in the source system comprises initializing a temporary variable for each field for each update in the entity in the source system, fetching all the updates for the entity in the source system from a history of the source system created on or after an initial time, iterating all updates for the entity in the source system in a descending order of update time for the entity in the source system. The temporary variable of each field for each update in the source system is assigned as the old as of state value.

According to an embodiment herein, the system for integrating a data from a source to a destination comprises a connector framework and wherein the connector framework comprises two connector modules, a polling module and an adopter module, a processing manager, a mapping manager, a recovery manager, a conflict manager and a failure manager. The polling module reads the plurality of changes from the source and the adapter module to write the plurality of changes at the destination. The processing manager processes a poll event using a processing engine. The mapping manager maps a plurality of fields of the source to the corresponding fields of a destination. The recovery manager automatically recovers a data in case of an unexpected failure. The failure manager controls a failed event during an integration process.

According to an embodiment herein, the failed event is the one in which a change in a data is not written to the destination, According to an embodiment herein, the conflict manager solves one or more conflicts occurring during an integration process and wherein a conflict is occurred, when a current value of any field of the destination doesn't match with a last value of a field of the source.

According to an embodiment herein, a processing engine is any one of a Java Process Definition Language (JBOSS JPDL), Drools and an Apache Orchestration Director Engine (ODE).

According to an embodiment herein, the processing manager reports a successful integration process back to the source after a completion of a successful integration process.

According to an embodiment herein, the processing manager passes a control to a failure manager after an unsuccessful integration process.

According to an embodiment herein, the recovery manager controls the adapter module and the polling module.

According to an embodiment herein, the conflict manager detects a conflict to activate an integration model to resolve the conflict automatically.

According to an embodiment herein, the integration model is at least one of a master/slave model, a partitioned ownership model, a dynamic ownership model, a peer to peer model and a custom configuration model. In the master/slave model, the entity is created at the master and one or more read only copies of the entity are created in slave system. In the partitioned ownership model one or more fields of the entity are created at one or more systems. An ownership of the entity changes dynamically in the dynamic ownership model. In the peer to peer model, a plurality of sites is able to make changes to the entities to carry out a conflict detection process and a conflict resolving process. A replication model is customized using the custom configuration model.

According to embodiment herein, the system further comprises an event based trigger and a scheduler based trigger to poll and synchronize a data from a source to a destination.

When a poll is active at the time of a scheduler based trigger, then the scheduler based trigger is skipped. When an event based trigger is received and no poll is active, then the event based trigger kicks off the polling process. When the poll is active, the event based trigger sets a flag indicating a need to repoll at the end of a poll. At the end of a poll, the repoll flag is checked for. When the repoll flag is set, then another poll cycle is immediately kicked off. An Integration solution provides an effective way to keep the two systems in synchronized condition. For achieving the synchronization and integration, it is very important to transfer all the changes from a source to a destination. For fetching all changes, the integration application/module has to look into the source after every pre set time interval, to check whether any entity is updated or not. Sometimes an entity gets updated more than once between the two successive polling intervals.

Consider case in which a first polling is done at a time t1 and the next polling is done at a time t5. But before t5 and after t1, the entity E1 is updated twice at the times t2 and t4. c1 is a change done at the time t2 and c2 is the change done at the time t4. Now suppose that the change c2 is dependent on the change c1 so that the change c2 can only be made only after doing the change c1. During an integration process, the polling done at t5 will fetch the entity E1 updated at t4 so that only the latest state of E1 which is c2 is polled and synchronized to the destination. The change c1 is not synchronized to destination and c2 fails as c1 which is a prerequisite is not found in the destination.

When there is a missing of updates of the changes done to the entity at the destination between two successive polling intervals when compared with the change history of the entities in the source, one way of solving the problem is to look into the system history. History is common terminology used in day to day software. A browser/search engine stores the history of the pages accessed, tabs closed etc. Similarly an ALM system stores a history to maintain the all operations done on an entity starting from its creation time to a deletion time. For any change done in system by an integration user or normal user, an entry will be immediately made in history table. In the above mentioned case, e for change c1, history table will have an entry for a change c1 done with the entity E1 at time t2 and similarly for the change c2. The Integration model looks into the history table to check whether there is any update in the system. For the above case the history table indicate two updates namely one for c1 and another for c2. For each update in history table, the system is provided with a set of fields for the changes in the transaction. The system stores only those fields that are changed or can store a state of all the fields at a given point of time. The integration application sends the as of state value of the entire fields irrespective of whether the field is updated or not or sends only the state of fields which are changed at a given update process. When the integration application sends only the fields that are updated, mapping of the destination is performed to derive the state of two fields F1 and F2, where F1 is updated once in a first update and F2 is updated twice in a second update. In such case a polling of the first update in an integration method results in sending only the value in F1 thereby yielding a wrong result as value in F2 is the latest value for the entity. To solve this, there is a need to send as of state value for all the fields at that time, irrespective of whether the field is updated or not. Consider system which stores only those fields which are updated in given update. The as of state values are obtained by backtracking the field state starting from current state to the time at which the last update is done in an integration process. The results are tabulated as follows.

| Sr. No | Entity | Time | Field | Old Value | New Value |
|--------|--------|------|-------|-----------|-----------|
| 1      | E1     | t1   | F1    | V1        | V2        |
| 2      | E1     | t2   | F2    | V1        | V2        |
| 3      | E1     | t3   | F1    | V2        | V3        |
| 4      | E1     | t4   | F2    | V2        | V3        |
| 5      | E2     | t5   | F1    | V1        | V2        |

Here t1 < t2 < t3 < t4.

In the integration process, the polling is done from time t0. The polling reveals that there are 5 updates after t0, starting with a first update at time t1. Now at t1, only F1 was updated. So the as of state value for t1 is V1. To get the as of state value of F2, initialize F2 temporarily with current state/condition, V3. All the changes done on E1 after the time t1 are fetched. The polling results in retrieving the changes with Serial numbers 2, 3 and 4. A polling is started with 4th to check whether the F2 is updated or not. When F2 is found to be updated then change F2 Temp to old value of F2 namely V2. The data in serial number 3 indicates that no change is done on F2. The data in serial number 2 indicates that F2 is changed and so F2Temp is set as V1. So the field state is changed at the end of integration process from F1=V1 to F2=V1. The same process is followed for all other updates.

Every integration solution has two functions. One function is a polling process to fetch all the changes to an entity from the system and pass the same for further processing. The integration solution also functions as an adapter to accept the changes coming from other systems to write the same to the destination. During a polling process, the integration solution has to take care of various expected and unexpected failure cases besides a data fetching process to ensure that all the changes are polled and a given change is fetched only once. Similarly the adapter is operated not only for writing the changes but also for ensuring that no change is written twice or no change is overwritten in the destination. Even when the polling module ensures that no change is polled and sent twice, the adapter is also operated to prevent the handling of update request coming more than once. For any good integration solution, all parts are decoupled from each other and all the components are not aware of the existence of anything other than their function. The polling part is not aware of the working and functioning of the adapter and the same holds good for the adapter too. Sometimes the adapter has to handle the situation in which a same change is to be written twice in the destination.

Consider a case in which the adapter does not keep track of the changes till the changes are written. The adapter fetches an event E1 and writes the same to destination with state S1 and the system goes down afterwards. Now a user comes and updates the destination entity to a state S2. When the polling module sends the entity E1 again at this moment due to some reason, then the adapter will write E1 again rolling back the state in S2 to S1. To ensure that the adapter does not roll back any changes done by an external user, it is important to check whether the event has already been addressed or not.

The embodiments herein disclose a solution to the above problem. According to the solution, a time at which the source entity was last updated is stored (in long format), referred as Source Last Update, in destination. The Source Last Update is stored in a custom field in the destination. The custom field is the field, which is not available in default, but a user is able to add the properties based on a requirement. The field is referred as Destination Last Update. When the source entity E1 was last updated at t1, then the entity at t1 contained in the destination system is referred as the Destination Last Update. Whenever an adapter gets any update request for the entity E1, then the adapter verifies that whether the incoming Source Last Update is greater than the Destination Last Update in E1. When the Source Last Update is found to be greater than the Destination Last Update, then only the update is carried out.

Consider the following example table comprising entity with update times.

| Entity | Time |
|--------|------|
| E1     | t1   |
| E1     | t2   |

Where t1 < t2.

After an event {E1, t1}, the adapter updates E1 in system and stores the same at t1 in the destination as a Destination Last Update. After the polling of event {E1, t2} the adapter detects that the Source Last Update at t2 is greater than the Destination Last Update at t1 for E1 and updates the event E1 in the destination at t2 as Destination Last Update. When the event {E1, t2} is polled again due to a failure in synchronisation process or for some reason, the Adapter repeats the same process to judge that no update is required as the Source Last Update in t2 is not greater than the Destination Last Update in t2.

Consider a different case in which a plurality of changes is done in a source system at a same time. The pluralities of changes are tabulated as follows.

| Entity | Time | Revision |
|---|---|---|
| E1 | t1 | r1 |
| E1 | t1 | r2 |

Where r1, r2 are revision number and r1 < r2.

The Adapter fetches an event {E1, t1, r1} and writes the same to the destination. When the adapter gets the event {E1, t1, r2}, it judges that no update is required as t1 is same in both the events and the update is skipped during the integration process. To solve the above problem in updating, Revision id is also stored in the Destination Last Update. So the Revision id stored in the Destination Last Update for the first event value in the above example is t1$r$. When the second event is fetched during a polling process, obtained, the revision id for Source Last Update is t1$r$2 which is greater than t1$r$1 and hence E1 is updated in the destination.

The abovementioned solution works for a single event, when the destination system is updated only once. When there are multiple updates to be done for an entity in the destination for a single change, then system/custom fields is updated and comments are added. When the Destinatiom Last Update is updated and the integration process is stopped while updating the system/custom fields due to some unknown reasons, no update is carried out after the resumption of the integration process in the next time as the Source Last Update is same as the destination Last Update.

One solution for the above mentioned problem is to roll back the updates done in the case of a failure. The adapter rolls back the state to the one that was present there before an update, when an update is failed after updating the system/custom fields. Hence it is not possible to delete the comments when there is any update after adding the comments and there is a failure in a recovery process. The Roll back generates multiple history records even in such a case. Another solution to the above mentioned problem is to assign a step number to a sub step in each update and to attach the step number to Destination Last Update. For example, a step number 1 is assigned to an updating process of system/custom fields and a step number 2 is assigned to a process of adding comments in above case, then the Destination Last Update formed for updating system/custom fields is t1$r$1_1 and the Destination Last Update formed for adding comments is t1$r$1_2. The comparison of step id is done to find whether the Source Last Update time and the revision id are same as the Destination Last Update time and revision id. When the step number in Destination Last Update is less than the step number of an update substep, an update is done. When an integration process is failed after updating the system/custom fields, then the value in Destination Last Update is t1$r$1_1. When an event is polled again after a resumption process in the next time, the first step of updating the system/custom fields is not done as the time and revision id is same as the Destination Last Update time and revision id and the step number for updating the system/custom field is not greater than step number 1 in the Destination Last Update. Later the same check of step number is done for adding the comment. As the sub step number 2 for adding the comment is greater than step number 1 in the Destination Last Update, the comments are added.

An aim of integration method is to synchronize a data from a source to a destination and to keep all the updates done in the source in a synchronized condition with the destination system. It is very critical and important for the integration module to ensure that the source data is written at a right place in the destination system. When a user created an entity E1 in the source system, then the integration application fetched the entity and wrote the fetched entity into destination as TE1. It is also important to identify the right entity and to conclude that E1 in the source is the same as TE1 in the destination. For achieving this, a primary key of the source entity in the target system is stored in a reserved custom field. The custom field is defined as a field which is not present in any system by default and rather the fields are added by the users based on their requirement. The name of the custom field is event-id. The event-id is updated by an integration method. When an event E1 is synchronized to the destination, an event-id of TE1 is stored for E1 and similarly an event id of TE2 is stored for E2. Whenever E1 is updated, the integration method searches for the event-id for E1. When the integration application receives the event id TE1, the update is done. When E2 is updated, integration application searches for the event-id TE2 in the end system. Further there is a need to append few more parameters such as System-name and project-name or project-id in event-id, to make the event-Id unique.

Consider a case of a bi-directional synchronization. The entity-id is updated only once, as the event-Id does not change for every update done on entity. The event-id is updated after synchronizing an update to the destination. When an entity E3 is created in the source and the same is synchronized to the destination as TE3 with event-Id=abc_project1_E3. But the integration process is stopped unexpectedly even before a post-sync and a write back is done in the source system. Meanwhile a user updated TE3 when the integration process is suspended. When the Integration method is started after x time, the integration application detects that a change has been done. After detecting a change, the integration application wants to synchronize the change in the destination with the change in the source system. The integration application tries to synchronise the destination with the other systems. Since the event-id is not yet written, the integration application judges that the entity does not exist and a new entry is created as a result thereby resulting a duplication of a data.

Another solution is to update event-Id in a source before updating a destination in a pre-synchronized condition. With respect to the previous case, an event-Id is already provided for E3, when an event on TE3 is polled. The integration application links that the entity E3 in the source is the same as TE3 in the destination and therefore all the updates between the two are synchronized.

FIG. 1 illustrates a flowchart illustrating a method for integrating data from a source to a destination. The method comprises generating a global-id by concatenating a source system, name of an entity, an entity project id and an entity id. An event-id is set corresponding to an entity id in the global id (101). A data is polled from a plurality of entities in a source system (102). A plurality of changes of a source system is sorted based on a time of update and an entity id (103). An old as of state value is created for each field for each update in the entity in the source system (104). A new as of state value is created for each field for each update in the entity in the destination system (105). An event is sent to a destination system with the old as of state value and the new as of state value for each update in the entity (106). The created old as of state value and the created new as of state values for each field for update in the entity are compared to detect a conflict on an entity (107). A time of update in the entity and a revision id of a change is sent to the destination (108). The global id is compared with an event id for each entity at the destination to detect a presence of an entity in the destination system (109).

An entity at the destination system is processed based an event id (110). The method further comprises a step of performing a multistep recovery process to ensure a reliable synchronization of entity and to recover a synchronization of entity in case of transaction failure of any kind (111), when a main transaction process has a plurality of sub transactions so that a recovery and synchronization of a data up to a sub transaction level is possible. The old as of state value and the new as of state values are created for each field for update in the entity to synchronize an event in the destination.

A step of processing the entity at the destination system comprises executing a main transaction process for the entity with the same global id, dividing the update process for the entity into a plurality of sub transactions, assigning a substep number to each sub transaction in the update process, comparing a time of revision of a last update value in the source system with a time of revision of a last update value in the destination system, processing the entity at the destination system based on a comparison of the time of revision of the last update value in the source system with the time of revision of the last update value in the destination system and creating a new entity with an event id equal to the first global id. The new entity is created when no entity is found in the destination system with a same global id. The main transaction process is an update process for the entity.

A step of processing the entity at the destination system based on a comparison of the time of revision of the last update value in the source system with the time of revision of the last update value in the destination system comprises updating the entity at the destination system, comparing a step number assigned to a sub transaction corresponding to a last update process in the source system with the step number assigned to a sub transaction corresponding to a last update process in the destination system and performing a sub transaction of the update process. The entity is updated when the time of revision of the last update value in the source system is greater than the time of revision of the last update value in the destination system and the global id is equal to the event id of the entity.

A step number assigned to a sub transaction corresponding to a last update process in the source system with the step number assigned to a sub transaction corresponding to a last update process in the destination system is compared when the time of revision of the last update value in the source system is smaller than or equal to the time of revision of the last update value in the destination system. A step of performing the sub transaction of the update process comprises processing a sub transaction of the update process and moving a control to a next step in the update process when the step number assigned to a sub transaction corresponding to the last update process in the source system is smaller than the step number assigned to a sub transaction corresponding to the last update process in the destination system. The sub transaction is processed when the step number assigned to a sub transaction corresponding to the last update process in the source system is greater than the step number assigned to a sub transaction corresponding to the last update process in the destination system.

A step of creating an old as of state value for each field for each update in the entity in the source system comprises initializing a temporary variable for each field for each update in the entity in the source system, fetching all updates for the entity in the source system from a history of the source system created on or after an initial time, iterating all updates for the entity in the source system in a descending order of update time for the entity in the source system. The temporary variable of each field for each update in the source system is assigned as the old as of state value.

Figure 2:
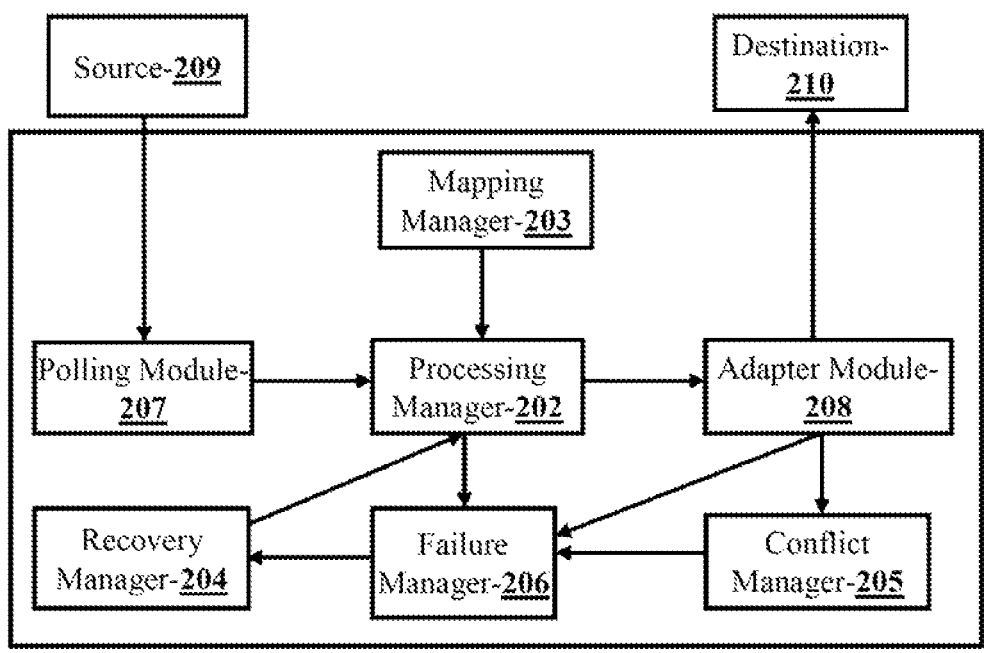
FIG. 2 illustrates a block circuit diagram of a system for integrating a data from a source to a destination, according to an embodiment herein.

FIG. 2 illustrates a block circuit diagram of a system for synchronizing data from a source to a destination. As shown in FIG. 2, the system comprises a connector framework, a processing manager 202, a mapping manager 203, a recovery manager 204, a conflict manager 205 and a failure manager 206. The connector framework comprises two connector modules, a polling module 207 and an adapter module 208. The polling module 207 reads the plurality of changes from the source 209 and the adapter module writes the plurality of changes at the destination 210.

The processing manager 202 processes a poll event using a processing engine. The processing engine is any one of but not limited to a Java Process Definition Language (JBOSS JPDL), Drools and an Apache Orchestration Director Engine (ODE). The processing manager 202 further reports a successful synchronization process back to the source 209 after a completion of a successful synchronization process. After an unsuccessful synchronization process the processing manager passes 202 a control to a failure manager 206.

The mapping manager 203 maps a plurality of fields of the source 209 to corresponding fields of a destination.

The recovery manager 204 automatically recovers a data in case of an unexpected failure. The recovery manager 204 further controls the adapter module 208 and the polling module 207.

The conflict manager 205 solves one or more conflicts occurring during a synchronization process. A conflict is occurred, when a current value of any field of the destination does not match with a last value of a field of the source 209.

The failure manager 206 controls a failed event during a synchronization process. The failed event is the one in which a change in a data is not written to the destination 210.

The conflict manager 207 detects a conflict to activate an integration model to resolve the conflict automatically. The integration model is at least one of but not limited to a master/slave model, a partitioned ownership model, a dynamic ownership model, a peer to peer model and a custom configuration model. In the master/slave model, the entity is created at the master and one or more read only copies of the entity are created in slave system. In the partitioned ownership model, one or more fields of the entity are created at one or more systems. In the dynamic ownership model, an ownership of the entity changes dynamically in the dynamic ownership model. In the peer to peer to model, a plurality of sites is able to make changes to the entities to carry out a conflict detection process and a conflict resolving process. In the custom configuration model, a replication model is customized.

According to embodiment herein, the system further comprises an event based trigger and a scheduler based trigger to synchronize a data from a source to a destination.

The system is combination of both an event based trigger and scheduled based trigger. In the event based trigger, generally a trigger is enabled in the source 209. Whenever a change occurs in the source 209, the source 209 is triggered as an event and is further consumed by the synchronization solution. Alternatively, the scheduler based trigger solution keeps looking for changes in the source 209. The system herein looks for the changes at specific time interval and also supports an event based trigger. If the event is generated from the source 209, the system consumes the event as scheduler job and processes the event.

Figure 3:
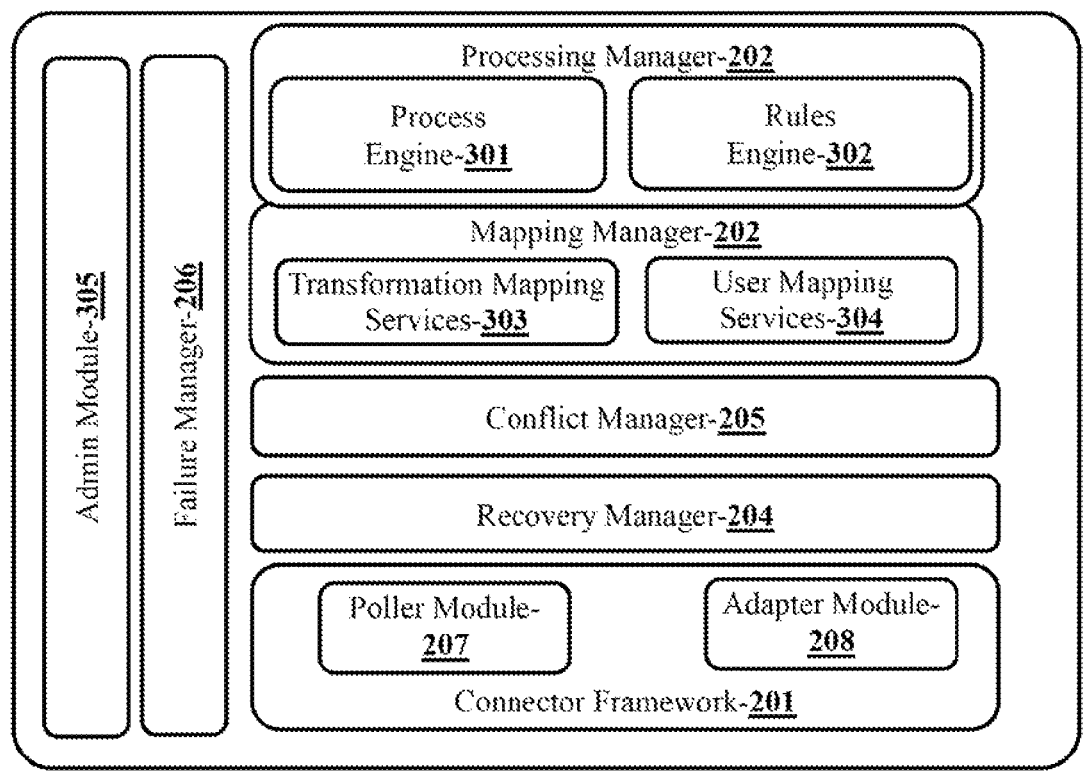
FIG. 3 illustrates a functional block circuit diagram of a system for integrating a data from a source to a destination, according to an embodiment herein.

FIG. 3 illustrates a functional block diagram of a system for synchronizing data from a source to a destination. An Integration Manager (IM) framework based on Enterprise Service Bus (ESB) principle is a key component of the architecture. The architecture is based on a hub and spoke topology. According to FIG. 3, the system comprises a connector framework 201 and connectors. The connector framework 201 is further provided with two sub modules such as a polling module 207 and an adapter module 208. The polling module 207 is responsible for reading the data changes from the source and adapter module 208 is responsible for writing the data to the destination.

The system includes a processing manager 201 responsible for processing a poll event. The processing manager 201 uses processing engine 301 for processing the data. The processing engine 301 is one of but not limited to JBOSS JPDL & Drools, Apache ODE. The rule engine 302 executes one or more business rules in a runtime production environment. The rules might come from a legal regulation, company policy or other sources. The rule engine 302 enables the company policies and other operational decisions to be defined, tested, executed and maintained separately. The processing manager 202 takes an action on a success or failure of a synchronizing process of the event. In general on completion of a successful synchronization process, the processing manager 202 notifies the source regarding the successful synchronization of an event or entity at the destination and adds the destination link of the event.

After a failure of the synchronization process, the processing manager 202 passes the failure report to a failure manager 206. The failure manager 206 controls the entire failed event during a synchronization process. The failed events are those in which a writing of changes to destination system is failed. OIM catch those events and create a failure queue. A synchronization process is retried repeatedly for a preset number of attempts after an unsuccessful synchronization process. The entire failed events can be notified and can be processed after human intervention.

The architecture further comprises a mapping manager 202 responsible is for mapping different fields of the source system to corresponding field of the destination. A transformation mapping services 303 of the mapping manager 202 provides transformation of one field in the source to a corresponding field in the destination. The user mapping services 304 maps a portal user ID to the user ID of synchronization system.

In case of system failure or any unexpected failures a recovery manager 204 automatically recovers the data. The recovery manager 204 controls both adapter module 208 and polling module 207. A new connector such as polling module 207 or an adapter module 208 does not need any kind of configuration or coding.

The conflict Manager 205 solves all the conflicts occurring during a synchronization process. A conflict occurs when the current value of any field of destination does not match with last value of the source field. The conflict manager 205 detects a conflict and also gives a plurality of integration models to resolve the conflict automatically. The integration model is at least one but not limited to a Master/Slave model, a partitioned ownership model, a dynamic ownership model, a peer to peer model and a custom configuration model.

In the Master/Slave model, an entity is mastered at one source and read only copies of the entities are created in other development systems. All changes to the entities must be made in the master. In the partitioned ownership model, different fields of the entity are mastered at different systems. In the dynamic ownership model, the entity ownership changes dynamically, but there is only one owner at any time. The current owner is indicated based on a value of a field in the entity. Only the current owner can pass the ownership to someone else. In the peer to peer model, the changes to the entities can be made from multiple sites. The peer to peer model typically performs a conflict detection process and a conflict resolution process. In the custom configuration model, the actual replication model is custom defined and typically it is a mixture of combination of the previous models.

The embodiments herein provide a method and system for integrating a data from a source to a destination in real time. The method and system ensures data in multiple systems are consistent across the systems. The solution provided is useful for distributed and non-compatible system integration. The proposed AS of state solution is useful in detecting conflict on data. Multi step recovery is used for any nested transactional application for recovery.

One of the major advantages of hub and spoke topology is that it decouples the source and destination by inserting a central component acting as an active mediator. The extension of system implementing a hub and spoke architecture is also very flexible as compared with a point to point integration. The central component acting as a hub can be reused while adding the extra spokes to the system. The architecture also reduces the number of interfaces needed to build and maintain the system. Since all the components are loosely coupled, in IM architecture, it is easy to switch to the processing engine. A recovery manager of the proposed system guarantees "NO LOSS DATA" model.

The embodiments herein ensure that the information in multiple systems is consistent across the systems. The solution can be useful for distributed and non-compatible system integration process. The embodiments provide a common gateway for accessing a non legacy system. Using the proposed techniques, the legacy system can be a front-end cluster of applications, providing the user with a single interface, the legacy system and enables the user to work with other systems. The solution fetches the event from a source and writes the event to a destination separately. It allows a space between a read and write operations. Hence a processing of event can be qualified by some business logic. Thus it provides a policy or business based integration.

The main objective of IM is to integrate the engineering systems and build an automated and transparent engineering ecosystem with full traceability. A current version of IM supports a bidirectional integration between the systems like Defect Tracking Systems (Jira, Bugzillaetc), Software Quality Management System (HP Quality Center), Product Management System (Rational Doors, Microsoft TFS etc), Application Management system (ALMCompleteetc). The techniques can be used in IT industry like ALM integration, SCM integration or non-it industry like Telecom for ERP integration. The common usage in IT industry is a policy based source code management with defect system.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the embodiments herein with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:

1. A method for integrating data from a source system to a destination system, said method comprising the following steps:
   generating a global-id by concatenating a source system name corresponding to an entity, and a corresponding entity project id and a corresponding entity id;
   setting an event-id corresponding to the entity id present in the global id;
   polling data from a plurality of entities of the source system;
   sorting a plurality of updates to the plurality of entities of the source system based on a time of update and a corresponding entity id;
   creating au old state value for each update on each of the plurality of entities in the source system;
   creating a new state value for each update on each of a plurality of entities in the destination system;
   sending an event to the destination system with the old state value and the new state value for each of a plurality of entities;
   comparing the old state value and the new state value for each of the updates to detect a conflicts on the plurality of entities in the destination system;
   sending a time of update of the plurality of entities and a revision id of a change to the destination system;
   comparing the global id with the event id for each entity, at the source system to detect a presence of the corresponding entity in the destination system;
   processing the plurality of entities at the destination system based on the event id; and
   synchronizing the entities at the destination system with the corresponding entities at the source system.

2. The method according to claim 1 wherein the step of processing the entity at the destination system comprises the following steps:
   executing a main transaction process for the entity, said main transaction process having the same global id as the entity thereof, and wherein the main transaction process is an update process for the entity;
   dividing the update process for the entity into a plurality of sub transactions;
   assigning a sub-step number to each sub transaction the update process;
   comparing a time of revision of a last update value in the source system with time of revision of a last update value in the destination system;
   processing the entity at the destination system based on a comparison of the time revision of the last update value in the source system with the time of revision of the last update value in the destination system; and
   creating a new entity with an event id equal to the global id, when no entity is found in the destination, system with said global id.

3. The method of claim 2, wherein a step of processing the entity at the destination system based on a comparison of the time of revision of the last update value in the source system with the time of revision of the last update value in the destination system, further comprises the following steps:
   updating the entity at the destination system, when the time of revision of the last update value in the source system is greater than the time of revision of the last update value in the destination system and the global id is equal to the event id of the entity;
   comparing the sub-step number assigned to a sub transaction corresponding to a last update process in the source System with the sub-step number assigned to a sub transaction corresponding to a last update process in the destination system, when the time of revision of the last update value in the source system is smaller than or equal to the time of revision of the last update value in the destination system; and
   performing a sub transaction of the update process.

4. The method as claimed in claim 3, wherein the step of performing a sub transaction of the update process comprises:
   processing a sub transaction of the update process, when the sub-step number assigned to a sub transaction corresponding to the last update process in the source system is greater than the sub-step number assigned to a sub transaction corresponding to the last update process in the destination system; and
   proceeding to the next step in the update process when the sub-step number assigned to a sub transaction corresponding to the last update process in the source system is smaller than the sub-step number assigned to a sub transaction corresponding to the last update process in the destination system.

5. The method as claimed in claim 1, wherein the step of creating an old value for each update in the entity in the source system comprises the following steps:
   initializing a temporary variable for each field, for each update in the entity in the source system;
   fetching all updates for the entity in the source system from a history of the source system created on or after an initial time;
   iterating all updates for the entity in the source system in a descending order of update time for the entity in the source system, wherein the temporary variable of each field for each update in the source system is assigned as the old value.

6. The method of claim 1, wherein a step of creating a new value for each field, for each update in the entity in the destination system comprises the following steps:
   initializing a temporary variable for each field, for each update in the entity in the destination system;
   fetching all updates for the entity in the destination system from a history of the destination system created on or after an initial time;
   iterating all updates for the entity in the destination system in descending order of update time for the entity in the destination system, wherein the temporary variable of each field in each update in the destination is assigned as the new state value.

* * * * *